United States Patent
Muraki et al.

(10) Patent No.: US 6,661,205 B1
(45) Date of Patent: Dec. 9, 2003

(54) CAPACITOR CHARGING METHOD AND CAPACITOR CHARGER

(75) Inventors: Saori Muraki, Tokyo (JP); Makoto Yamamoto, Tokyo (JP); Yuji Honma, Tokyo (JP); Shinichi Shinohara, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 10/208,256

(22) Filed: Jul. 30, 2002

(51) Int. Cl.[7] .............................................. H01M 10/44
(52) U.S. Cl. ....................................................... 320/166
(58) Field of Search ................................. 320/139, 141, 320/145, 148, 161, 162, 166

(56) References Cited

U.S. PATENT DOCUMENTS 6,384,579 B2    5/2002    Watanabe

FOREIGN PATENT DOCUMENTS

| JP | 09-307165 | 11/1987 |
|----|-----------|---------|
| JP | 08-107245 | 4/1996 |
| JP | 08-130870 | 5/1996 |
| JP | 09-275633 | 10/1997 |
| JP | 09-312974 | 12/1997 |
| JP | 10-052039 | 2/1998 |
| JP | 10-117478 | 5/1998 |
| JP | 2002-010486 | 1/2002 |
| JP | 2002-064944 | 2/2002 |
| JP | 2002-118976 | 4/2002 |
| JP | 2002-198597 | 7/2002 |
| WO | WO 99/31773 | 6/1999 |

OTHER PUBLICATIONS

Muraki, et al., "Capacitor Charger Using a Resonant Converter and Its Digital Predictive Control", Technical Report of IEICE.EE 2001–32, The Institute of Electronics, Information and Communication Engineers, pp. 23–29, Nov., 2001.

Muraki, et al., "A Study of the Digital Control System in the Quick Capacitor Charger for Excimer Laser", Origin Technical Journal, No. 65, pp. 11–17, May 2002.

Primary Examiner—Edward H. Tso
(74) Attorney, Agent, or Firm—Hoffmann & Baron, LLP

(57) ABSTRACT

A capacitor charger is provided that can control charging voltage with high accuracy, and repeat a process of increasing it to a target charging voltage at high speed. In a first step, an ac voltage is generated in a resonant type inverter section by fixed frequency driving pulses, the ac voltage is converted to a dc voltage, a load capacitor is charged by the dc voltage, a calculation pulse in the driving pulse has a predetermined, fixed driving pulse width, and the load capacitor is charged by $\Delta Vn$ each pulse. In a second step, when the charging voltage V1 of the load capacitor and the target voltage V2 satisfy an inequality relationship "V2>V1>V2−$\Delta Vn$", charging is performed by a single or a plurality of final pulses having a driving pulse width W2 (W1>W2) as required to step up the voltage by "V2−V1".

20 Claims, 8 Drawing Sheets

EQUIVALENT CIRCUIT OF TRANSFORMER
(IGNORING RESISTANCE)

PERIOD WHEN LOAD VOLTAGE IS NOT INCREASED
(SWITCHED ON, RESONANT CAPACITOR CHARGING PERIOD)

LOAD VOLTAGE INCREMENTATION PERIOD
(SWITCHED ON)

LOAD VOLTAGE INCREMENTATION PERIOD
(SWITCHED OFF)

FIG. 6

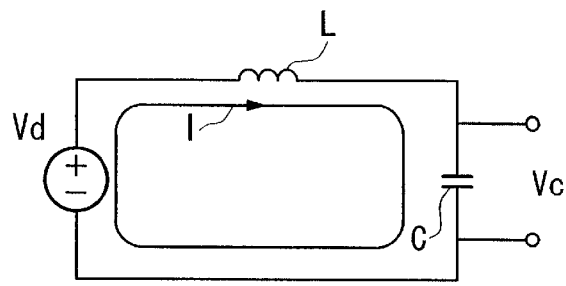

FIG. 7

| OPERATION PERIOD | \<REGION a\><br>PERIOD OF CHARGING BY ONLY RESONANT CAPACITOR Cr | \<REGION b\><br>CHARGING VOLTAGE V1 INCREMENTATION PERIOD | \<REGION c\><br>PERIOD OF CHARGING BY REACTOR CURRENT |
|---|---|---|---|
| L | Lp | Lp | Lp |
| C | Cr | Cp | Cp |
| Vd | +Vd | +Vd | −Vd |

FIG. 8

| OPERATION PERIOD | a | b | c |
|---|---|---|---|
| CURRENT FLOWING THROUGH RESONANT CAPACITOR $C_R$ | Icr | (Cr/Cp) Icp | (Cr/Cp) Icp |
| CURRENT FLOWING THROUGH LOAD CAPACITOR $C_D$ | 0 | (Cd/Cp) Icp | (Cd/Cp) Icp |

CAPACITOR CHARGING METHOD AND CAPACITOR CHARGER

BACKGROUND OF THE INVENTION

1. Field of the Invention

The present invention relates to a resonant type capacitor charger that charges a load capacitor to a preset voltage cyclically, at high speed, and with high accuracy.

2. Description of the Related Art

Capacitor chargers are used for charging first stage capacitors of driving pulse power sources for driving pulse lasers such as a copper vapor laser, an excimer laser or the like, at high speed, repeatedly.

A capacitor charger is constructed such that an output of an inverter section IV is connected to a rectifier RE as shown in FIG. 10.

That is, the capacitor charger controls the power output from a dc voltage source DC, converts a direct current supplied from the dc voltage source DC into an alternating current (square wave ac voltage) using the inverter section IV, rectifies the alternating current boosted by a transformer H using the rectifier RE, and charges a load capacitor $C_D$ using this rectified current.

Then, a control section 100 controls the charging of the load capacitor $C_D$, being a charged object, by measuring a measured voltage V10, which is proportional to a charging voltage value V1 of the load capacitor $C_D$, using a voltage divider M1, and comparing the measured voltage V10 detected with a preset voltage V2 that indicates a target value of charging voltage of the load capacitor $C_D$.

That is, the control section 100 determines whether the measured voltage V10 from the voltage divider M1 exceeds the internal preset voltage V2 or not. If exceeding, it stops the inverter section IV at this point of time and stops charging the load capacitor $C_D$.

However, in a conventional capacitor charger, since it is necessary to satisfy the high speed required for a driving pulse laser, repeated charging at high speed is required, and hence it is necessary to increase the charging current to the load capacitor $C_D$ during a half cycle corresponding to one driving pulse driving the inverter section IV.

Therefore, there are problems in a conventional capacitor charger that since the charging voltage charged by the charging current in each half cycle becomes high, even if the inverter section IV is stopped at the time that the charging voltage of the load capacitor $C_D$ reaches the target value, it can easily overshoot, so control cannot be performed with high accuracy, and the output of the driving pulse laser is inconsistent.

On the other hand, in the above-described capacitor charger, if the number of driving pulses for driving the inverter section IV during the charge period is increased, and the charging voltage value V1 of the load capacitor $C_D$ and the preset voltage V2 are compared accurately, in order to perform a charging process with high accuracy, it is necessary to limit the charging voltage in one driving pulse.

By so doing, even if the accuracy of charging can be increased in the conventional capacitor charger, there is a disadvantage that the high speed charging required for a driving pulse laser cannot be satisfied.

SUMMARY OF THE INVENTION

The present invention takes this background into consideration with an object of providing a capacitor charger that can control charging voltage with high accuracy, and repeat a process of raising it to a target charging voltage at high speed.

A capacitor charging method according to a first aspect of the present invention is a capacitor charging method in which a resonant type inverter section is operated by driving pulses at a fixed frequency to generate an ac voltage, the ac voltage is converted to a dc voltage, and a capacitor is charged using the dc voltage, comprising the steps of: a first step where a first type of driving pulse of the driving pulses has a fixed driving pulse width W1 determined in advance, which charges the capacitor by a boost voltage $\Delta Vn$ (n is a natural number, step up voltages $\Delta V1$, $\Delta V2$, . . . that gradually decrease as a load capacitor $C_D$ is charged) at each input of the first type of driving pulse; and a second step which charges the capacitor by a single or a plurality of a second type of driving pulse having a controlled driving pulse width W2 (W1>W2) as required to increase the voltage of the capacitor by a voltage [V2−V1] when a charging voltage V1 of the capacitor reaches a value that satisfies [V2>V1>V2−V1<$\Delta Vn$] for a target voltage value V2.

A capacitor charging method according to a second aspect of the present invention is a capacitor charging method in which a resonant type inverter section is operated by driving pulses at a fixed frequency to generate an ac voltage, the ac voltage is converted to a dc voltage, and a capacitor is charged using the dc voltage, comprising the steps of: a first step where a first type of driving pulse of the driving pulses has a fixed driving pulse width W1 determined in advance, which charges the capacitor by a boost voltage $\Delta Vn$ (n is a natural number, $\Delta V1$, $\Delta V2$, . . . ) at each input of the first type of driving pulse; and a second step which charges the capacitor by a plurality of a second type of driving pulse having a fixed driving pulse width W3 (W1>W3) in order to boost the voltage by [V2−V1] when a relationship between a charging voltage V1 of the capacitor and a target voltage value V2 is [V2−V1<$\Delta Vk$+ . . . +$\Delta Vn$ (k is a natural number, and k<n), or [V2−V1<$\Delta Vn$].

In the capacitor charging method according to the second aspect of the present invention, only the last driving pulse among a plurality of the second type of driving pulses in the second step may have a controlled driving pulse width.

A capacitor charging method according to a third aspect of the present invention is a capacitor charging method in which a resonant type inverter section is operated by driving pulses at a fixed frequency to generate an ac voltage, the ac voltage is converted to a dc voltage, and a capacitor is charged using the dc voltage, comprising the steps of: a first step where a first type of driving pulse of the driving pulses has a fixed driving pulse width W1 determined in advance, which charges the capacitor by a boost voltage $\Delta Vn$ (n is a natural number, step up voltages $\Delta V1$, $\Delta V2$, . . . that gradually decrease as a load capacitor $C_D$ is charged) at each input of the first type of driving pulse; a second step which when a charging voltage V1 of the capacitor is a midpoint preset voltage value V3 that is lower than a target voltage value V2, charges by a boost voltage $\Delta Vm$ (m is a natural number), by using a second type of driving pulse with a new, fixed driving pulse width W4 obtained with consideration of a change of input voltage to the resonant type inverter section; and a third step which charges by a third type of driving pulse having a controlled driving pulse width W5 (W5<W4) as required to boost the voltage by [V2−V1<$\Delta Vm$].

In the capacitor charging methods according to the present invention, at the start of charging of the first step, the capacitor may be charged by a fixed driving pulse width smaller than the fixed driving pulse width W1, or a soft start driving pulse with a gradually increasing driving pulse width.

A capacitor charger according to a first aspect of the present invention is a capacitor charger in which a resonant type inverter section is switched by driving pulses at a fixed frequency to generate an ac voltage, the ac voltage is converted to a dc voltage by a rectifier, and a capacitor is charged using the dc voltage, comprising: a control section that controls such that the voltage of the capacitor is increased by a boost voltage $\Delta Vn$ (n is a natural number, step up voltages $\Delta V1, \Delta V2, \ldots$ that gradually decrease as a load capacitor $C_D$ is charged) at each input to the resonant type inverter section of a first type of driving pulse with a predetermined, fixed driving pulse width W1, calculates an $n^{th}$ first type of driving pulse with the fixed driving pulse width W1 when a relationship between a charging voltage V1 of the capacitor and a target voltage value V2 satisfies [V2>V1>V2−V1<$\Delta$Vn] (n is a natural number), calculates at least one of a required adjusted driving pulse width and the number of driving pulses, of a second type of driving pulse that is supplied in order to increase the voltage of the capacitor by [V2−V1] when a relationship [V2−V1<$\Delta$Vn] is satisfied, drives the resonant type inverter section by the first type of driving pulse until the relationship [V2−V1<$\Delta$Vn] is satisfied for the charging voltage V1, drives the resonant type inverter section by the second type of driving pulse when the relationship [V2−V1<$\Delta$Vn] is satisfied, and charges the capacitor to the target voltage value V2.

A capacitor charger according to a second aspect of the present invention is a capacitor charger in which a resonant type inverter section is switched by driving pulses at a fixed frequency to generate an ac voltage, the ac voltage is converted to a dc voltage by a rectifier, and a capacitor is charged using the dc voltage, comprising: a control section that controls such that the voltage of the capacitor is increased by a boost voltage $\Delta Vn$ (n is a natural number, step up voltages $\Delta V1, \Delta V2, \ldots$ that gradually decrease as a load capacitor $C_D$ is charged) at each input to the resonant type inverter section of a first type of driving pulse with a predetermined, fixed driving pulse width W1, calculates an $n^{th}$ first type of driving pulse with the fixed driving pulse width W1 when a relationship between a charging voltage V1 of the capacitor and a target voltage value V2 satisfies [V2−V1<$\Delta$Vn+ ... $\Delta$Vn+k] (k is a natural number, k<n), or [V2−V1<$\Delta$Vn], calculates the number of driving pulses of a second type of driving pulse with a fixed driving pulse width W2 (W1>W2) that is supplied in order to increase the voltage of the capacitor by [V2−V1] when a relationship [V2−V1<$\Delta$Vn+ ... $\Delta$Vn+k] or [V2−V1<$\Delta$Vn] is satisfied, drives the resonant type inverter section by the first type of driving pulse until the relationship [V2>V1>V2−V1<$\Delta$Vn+ ... $\Delta$Vn+k] or [V2−V1<$\Delta$Vn] is satisfied for the charging voltage V1, drives the resonant type inverter section by the second type of driving pulse when the relationship [V2>V1>V2−V1<$\Delta$Vn+ ... $\Delta$Vn+k] or [V2−V1<$\Delta$Vn] is satisfied, and charges the capacitor to the target voltage value V2.

Here, $\Delta Vn+ \ldots +\Delta Vn+k$ represents the sum of voltages charged by respective driving pulses of a plurality of supplied driving pulses.

A capacitor charger according to a third aspect of the present invention is a capacitor charger in which a resonant type inverter section is switched by driving pulses at a fixed frequency to generate an ac voltage, the ac voltage is converted to a dc voltage by a rectifier, and a capacitor is charged using the dc voltage, comprising: a control section that controls such that the voltage of the capacitor is increased by a boost voltage $\Delta Vn$ (n is a natural number, $\Delta V1, \Delta V2, \ldots$) at each input to the resonant type inverter section of a first type of driving pulse with a predetermined, fixed driving pulse width W1, calculates an $n^{th}$ first type of driving pulse with the fixed driving pulse width W1 when a relationship between a charging voltage V1 of the capacitor and a midpoint preset voltage value V3, that is lower than a target voltage value V2, satisfies [V2−V1<$\Delta$Vn+ ... $\Delta$Vn+k] (k is a natural number, and k<n), drives the resonant type inverter section by a second type of driving pulse of a fixed driving pulse width W3 obtained by another calculation when the relationship [V2−V1<$\Delta$Vn+ ... $\Delta$Vn+k] is satisfied, calculates a controlled pulse width or the number of controlled driving pulses of a third type of driving pulse when a relationship [V2−V1<$\Delta$Vp] (p is a natural number) is satisfied for the charging voltage V1 of the capacitor, drives the resonant type inverter section by the third type of driving pulse, and charges the capacitor to the target voltage value V2.

In the capacitor charger according to any one of the first to third aspects of the present invention, the control section may calculate the driving pulse width using a predetermined equation based on an input voltage value input to the capacitor charger, a voltage value of charging voltage V1, and a current value supplied to the capacitor.

In the capacitor charger according to any one of the first to third aspects of the present invention, the control section may read out from a lookup table showing a relationship between detected values of input voltage input to the capacitor charger, voltage values of the charging voltage V1, and current values supplied to the capacitor, and values of the driving pulse width, a driving pulse width value corresponding to these detected values, to thereby calculate the driving pulse width.

In the capacitor charger according to any one of the first to third aspects of the present invention, the control section may read out from a lookup table showing a relationship between detected values of input voltage input to the capacitor charger and the charging voltage V1, and values of the driving pulse width, a driving pulse width value corresponding to these detected values, to thereby calculate the driving pulse width.

According to the present invention, it is possible to obtain an adjusted driving pulse width with high accuracy, and obtain a final charging voltage V1 that has a smaller difference from the target voltage value V2.

Furthermore, according to the present invention, it is possible to charge to the target voltage value V2, being the final target of the charging voltage V1, at high speed.

BRIEF DESCRIPTION OF THE DRAWINGS

FIG. 6 is a circuit model for performing calculations of each region, in which the circuit models of each region in FIG. 5A through FIG. 5C are standardized.

FIG. 7 is a table showing values of inductance of an inductor L, capacitance of a capacitor C, and voltage value Vd of a dc voltage in regions a, b and c respectively.

FIG. 8 is a table showing values of current flowing in a resonant capacitor $C_R$ in FIG. 6 and values of current flowing in a load capacitor $C_D$ in FIG. 6.

DETAILED DESCRIPTION OF THE PREFERRED EMBODIMENTS

The principle of a capacitor charger according to the present invention is that a load capacitor is charged at high speed and with high accuracy in a situation where an inverter operates at a frequency associated with a resonant frequency determined by a resonant inductor and a resonant capacitor, and the charging of the load capacitor is performed preferably with a maximum permissible driving pulse width, the location of a driving pulse one pulse prior to a driving pulse at which charging with this maximum driving pulse width would cause a target voltage to be exceeded, that is the former driving pulse in a train of driving pulses input to the inverter, is detected and the width of a finally output driving pulse (final driving pulse) is adjusted during the period of the former driving pulse (calculation driving pulse) for the purpose of fine adjustment of the charging voltage. In a case where there is time available during charging, a driving pulse with a driving pulse width that is set to be smaller than the maximum driving pulse width may be used. Furthermore, a driving pulse width some pulses earlier may be adjusted, or the number of driving pulses may be adjusted.

At the initial stage of charging, charging may start with a fixed driving pulse width that is smaller than a fixed driving pulse width (calculation driving pulse width), or a soft start driving pulse with a gradually increasing driving pulse width.

Hereunder is a description of embodiments of the present invention with reference to the figures.

Embodiment 1

Figure 1:
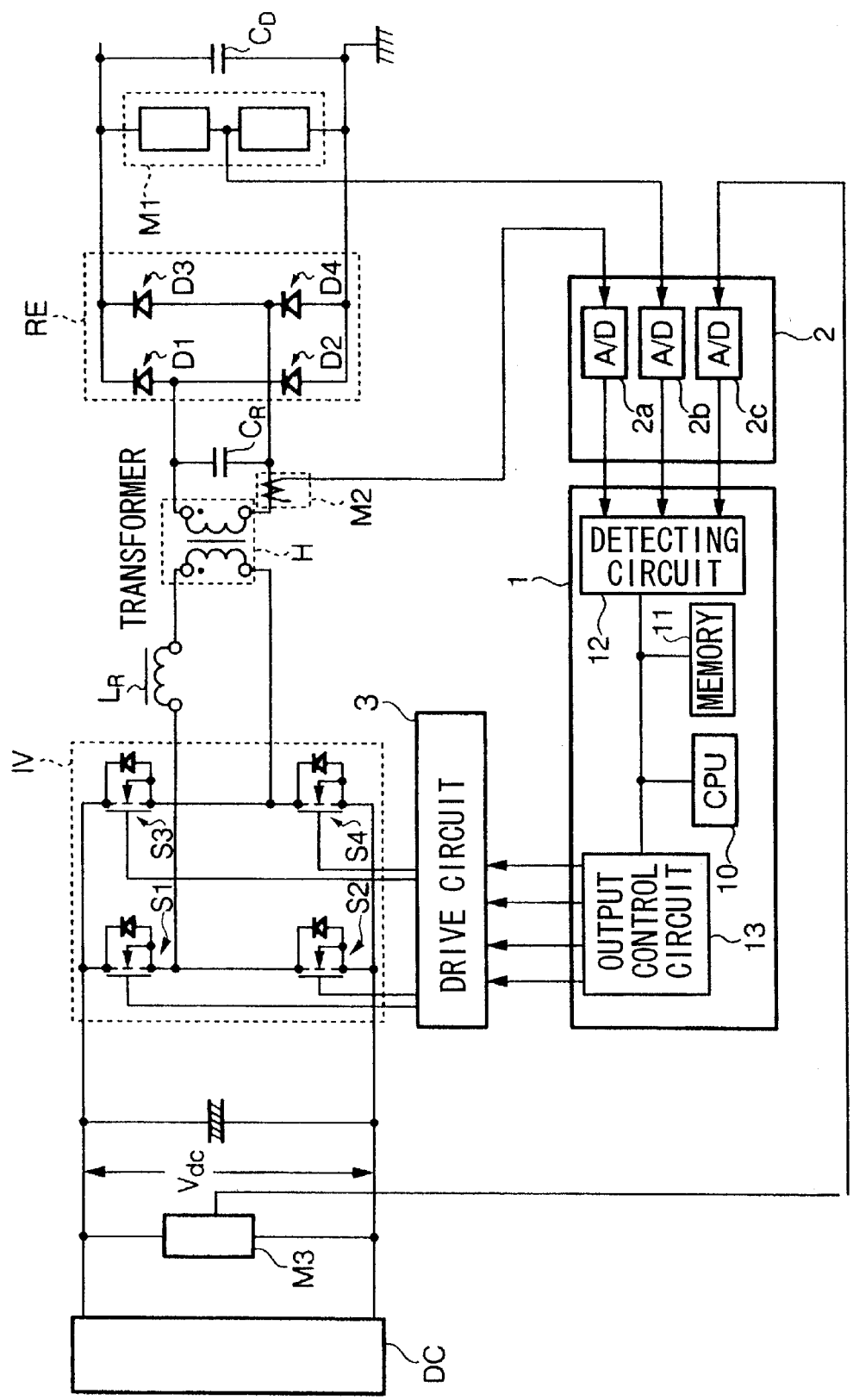
FIG. 1 is a conceptual diagram showing the construction of a capacitor charger according to embodiments of the present invention.

FIG. 1 is a block diagram showing a configuration example of an inverter type capacitor charger according to a first embodiment of the present invention.

In this figure, an inverter section IV is of a driving pulse width modulation type, comprising switching elements S1 through S4 such as FETs (field effect transistors), IGBTs (insulated gate bipolar transistors) or the like, which converts a dc voltage output from a dc voltage source DC, being a rectified commercial ac voltage, into a square wave ac voltage (referred to hereunder as ac voltage).

That is, when the inverter section IV generates an ac voltage, it switches on the combination of switching elements S3 and S2 and the combination of switching elements S1 and S4 alternately in accordance with control of an input driving pulse train, to convert from a dc voltage to an ac voltage.

One terminal of the primary side of a booster transformer H is connected to the inverter section IV via a resonant inductor $L_R$, and the other terminal is connected directly thereto.

Furthermore, the secondary side of the transformer H has a resonant capacitor $C_R$ inserted across its terminals and is connected to a rectifier RE. The resonant capacitor $C_R$ may be connected on the primary side.

The rectifier RE, comprising rectifier diodes D1 through D4, full-wave rectifies the boosted ac voltage output from the transformer H, and outputs it to a load capacitor $C_D$ as a dc charging current.

The control section 1 comprises a CPU (central processing unit) 10, a program for the CPU 10 to control the operation of the capacitor charger, a range of tables to be described later, a memory 11 that stores data and the like during calculations, a detecting circuit 12 to which measured data input from a measurement signal input section 2 are input, and an output control circuit 13 that outputs the train of driving pulses that control on and off of the switching elements S1 through S4 of the inverter section IV.

The measurement signal input section 2 comprises A/D converters (analog/digital converters) 2a, 2b and 2c, to which measured data from a voltage divider M1, a current detector M2 and a voltage detector M3 are input.

A charging voltage value V1 to be measured, which is stored in the load capacitor $C_D$, is divided by the voltage divider M1, and the measured voltage V10 is digitized by A/D conversion in the A/D converter 2b and output to the detecting circuit 12 as output voltage data D0 expressed in a predetermined number of bits (for example 8 bits).

Furthermore, the current detector M2 measures the current value of current flowing in a secondary winding of the transformer H, and outputs a voltage value corresponding to this measured current value. The current detector M2 may be connected such that it detects the current in the winding on the primary side of the transformer H.

Then, the A/D converter 2a digitizes the voltage value input from the current detector M2 by A/D conversion, and outputs it as current data D2 expressed in a predetermined number of bits.

Furthermore, the voltage detector M3 measures the voltage $V_{DC}$ output from the dc voltage source, and outputs the measured voltage value Vdc through an isolating amplifier (not shown in the figure) to the measurement signal input section 2.

Then, the A/D converter 2c digitizes the voltage value Vdc input from the voltage detector M3 through the isolating amplifier (not shown in the figure) by A/D conversion, and outputs it as voltage data D3 expressed in a predetermined number of bits.

In the control section 1, the detecting circuit 12 converts the supplied output voltage data D0 to output voltage data D1, being a digital value of the charging voltage value V1 prior to the divided output voltage data D0, based on the division ratio of the voltage divider M1.

Then, the detecting circuit 12 calculates an $n^{th}$ driving pulse in a train of driving pulses input to the inverter section IV, which satisfies the following equation (0) of the relationship between the charging voltage value V1 and a target voltage value V2, based on this output voltage data D1.

$$V2 > V1 > V2 - \Delta Vn \quad (0)$$

Here, the incremental voltage value ΔVn is digitized, and represents the charging voltage value of each input driving pulse in a train of driving pulses having a preset driving pulse width at a frequency associated with a resonant frequency determined by the resonant inductor $L_R$ and the resonant capacitor $C_R$. This incremental voltage value ΔVn becomes smaller as the charging voltage of the load capacitor $C_D$ increases.

That is, n in the above-described incremental voltage value ΔVn is a natural number, and as the value of n becomes larger in the incremental voltage values ΔV1, ΔV2, ΔV3, ΔV4, . . . the charging voltage becomes smaller but with the same preset pulse width.

Furthermore, the target voltage value V2 is determined in the memory 11 in the control section 1, and is a final set voltage, being a target of the charging voltage value V1 of the load capacitor $C_D$.

The maximum width of this driving pulse is determined to be a driving pulse width at which there is no short-circuit caused by the switching elements S1 and S2 or S3 and S4 being turned on due to adjacent driving pulses at the same time during the on and off operations of switching elements S1 through S4.

Evidently this $n^{th}$ driving pulse is the driving pulse immediately preceding the last driving pulse (referred to hereunder as the final driving pulse) after which charging of the load capacitor $C_D$ with the preset driving pulse width would cause the target voltage value V2 to be exceeded. Then, the output control circuit 13 calculates an adjusted driving pulse width for the final driving pulse as required for a voltage rise of "V2-V1". For the calculation, when a driving pulse is input, firstly it is determined whether the driving pulse is the final driving pulse or not, and in the case where it is determined to be the final driving pulse, the driving pulse width of the final driving pulse is calculated.

Here, to determine whether a sequentially input driving pulse is the final driving pulse or not, the charging voltage V1 of the load capacitor $C_D$ is detected when a driving pulse is input, and it is determined whether V1<V2, and V2−V1<ΔVn are satisfied or not. When V2−V1<ΔVn is satisfied, then after the final $(n+1)^{th}$ driving pulse is input, the diodes of the rectifier RE conduct and the charging voltage V1 is charged to the target voltage value V2 by the $(n+1)^{th}$, or final, driving pulse whose driving pulse width has been adjusted.

The driving pulse width may be calculated during the driving pulse period one pulse before the final driving pulse. However, as mentioned previously, as the load capacitor $C_D$ charging progresses, the incremental voltage value ΔVn for each driving pulse becomes smaller, that is the period during which charging current flows becomes shorter as charging approaches the end. Accordingly it is also possible to calculate the adjusted driving pulse width after the final driving pulse has risen, and complete the final driving pulse so as to give the calculated adjusted driving pulse width.

In this embodiment, the final driving pulse is a single driving pulse. However, there may be two or three final driving pulses, for example. In the case of two for example, the arrangement may be such that the $(n-1)^{th}$ driving pulse is calculated when V2−V1<ΔVn−1+ΔVn is satisfied, and by adjusting the driving pulse widths of the two final driving pulses to be equal, the charging voltage V1 reaches the target voltage value V2 by these two final driving pulses. In this case, since there is time available for the detection and calculation of voltage and current, charging is possible with higher accuracy. At this time, pulse widths Wn−1 and Wn of the driving pulses used for charging the step-up voltages ΔVn−1 and ΔVn may be a fixed value which is shorter than the preset pulse width (width of calculation driving pulse), and also the pulse widths Wn−1 and Wn may be in a relationship Wn−1>Wn.

Furthermore, in order to enhance the charging accuracy in response to variations of the ac input voltage, then at a midpoint preset voltage value V3 that is lower than the target voltage V2 by a voltage value corresponding to the charging voltage boosted by 5 driving pulses for example, namely, when V2−V1<ΔVn−4+ΔVn−3+ΔVn−2+ΔVn−1+ΔVn is satisfied, calculation is made with the detected ac input voltage included as a calculation factor when determining the driving pulse width of driving pulses, and the inverter section IV is driven for charging by driving pulses with the obtained new, fixed driving pulse width, and charging is performed at the final driving pulse with a driving pulse width adjusted as mentioned previously during the last half cycle, to charge to the target voltage value V2.

At this time, the pulse widths Wn−4, Wn−3, Wn−2, Wn−1 and Wn used for charging at each of the boost voltages ΔVn−4, ΔVn−3, ΔVn−2, ΔVn−1 and ΔVn may be a fixed value shorter than the preset pulse width (width of calculation driving pulse). Alternatively, the pulse widths Wn−4, Wn−3, Wn−2, Wn−1 and Wn may also be in a relationship Wn−4>Wn3>Wn−2>Wn−1>Wn.

Moreover, if the pulse widths of the driving pulses used for charging at each of ΔVn−4, ΔVn−3, ΔVn−2, ΔVn−1 and ΔVn are fixed values shorter than the preset pulse width (width of calculation driving pulse), the pulse width of the last final driving pulse may be controlled.

During calculation driving pulse periods detected in the above manner, the output control circuit 13 calculates an incremental voltage value ΔVc as an adjustment to the target voltage value V2 at the final driving pulse based on the charging voltage value V1 and the target voltage value V2 input from the CPU 10, calculates an adjusted driving pulse width, being the driving pulse width for incrementing by this incremental voltage value ΔVc, and outputs it to the appropriate combination of switching elements (switching elements S3 and S2 or switching elements S1 and S4) via a drive circuit 3.

As a result, a capacitor charger of the present embodiment can perform a charging process with a maximum driving pulse width or a preset driving pulse width until the driving pulse immediately before the final driving pulse, and adjust to the target voltage value at the final driving pulse with an adjusted driving pulse width.

As follows is a description of operational examples of second through fourth embodiments in which an adjusted driving pulse width of the capacitor charger of the present embodiment described above is calculated to charge the load capacitor $C_D$.

Embodiment 2

A method for obtaining the adjusted driving pulse width of the final driving pulse by calculation will be described as a second embodiment.

Figure 2:
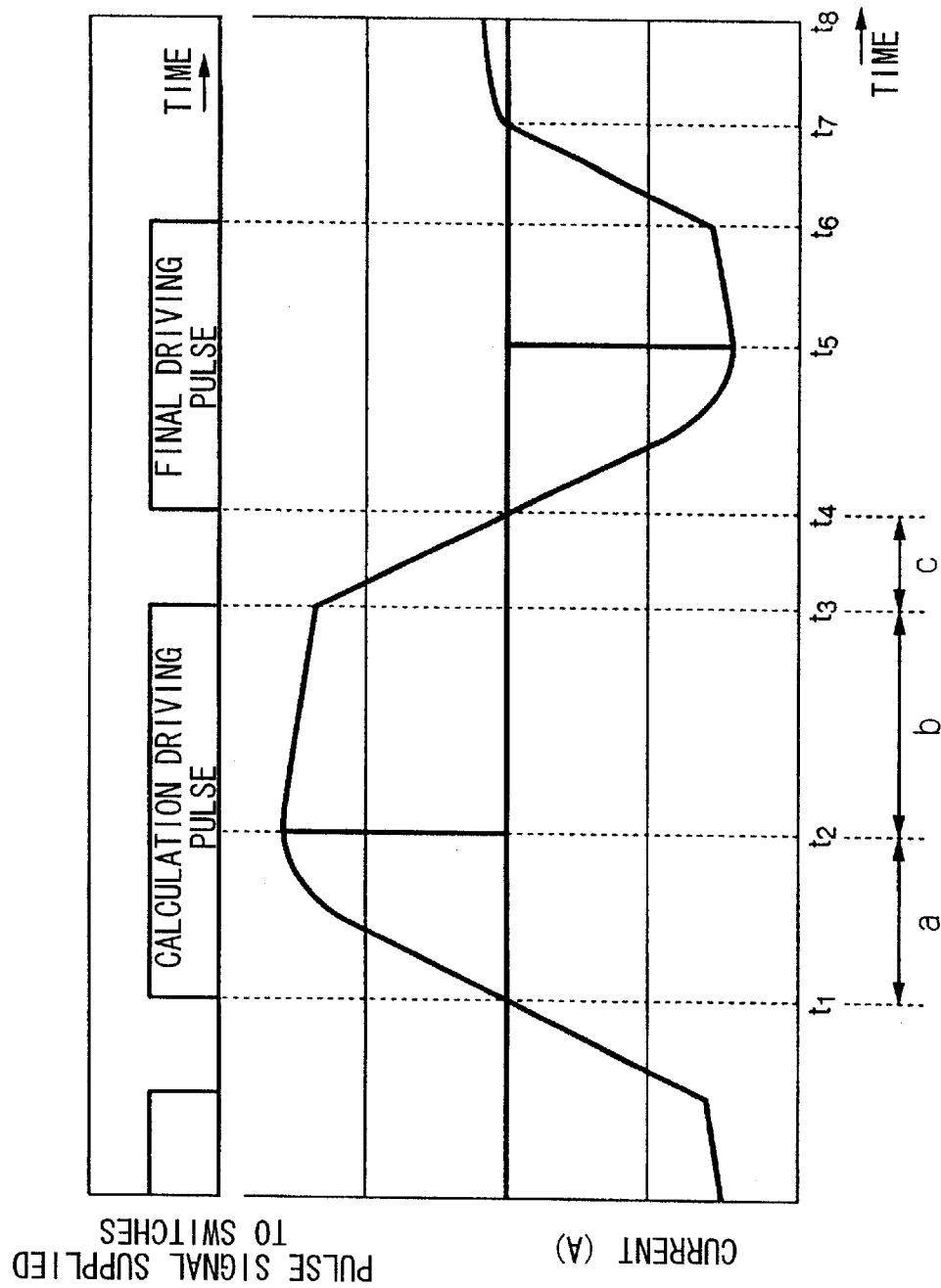
FIG. 2 is a waveform diagram showing the relationship between driving pulse width input to combinations of switching elements in an inverter section IV and current flowing through a secondary winding of a transformer H.
Figure 3:
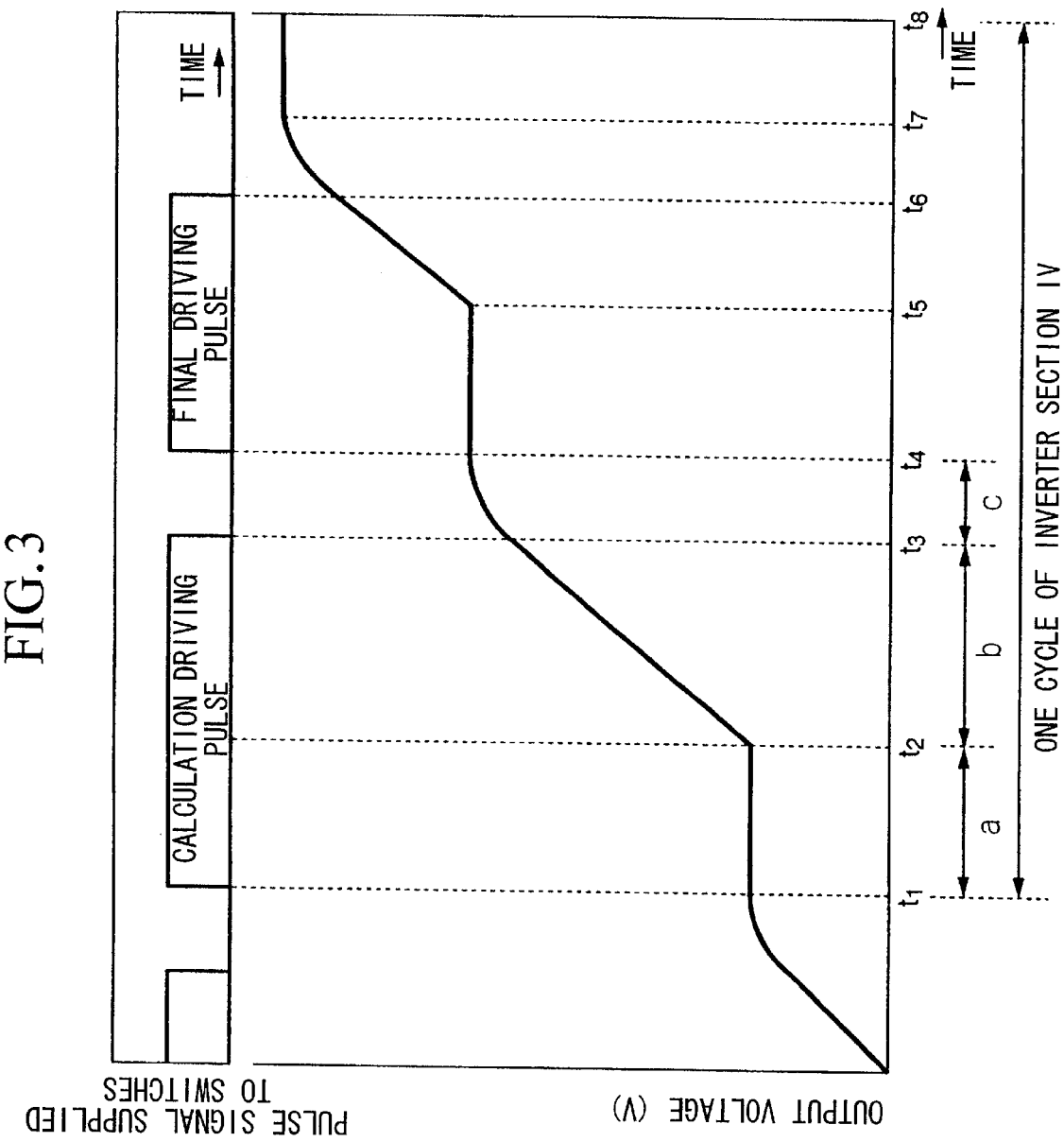
FIG. 3 is a waveform diagram showing the relationship between driving pulse width input to combinations of switching elements in an inverter section IV and a charging voltage value V1 in a load capacitor $C_D$.

FIG. 2 and FIG. 3 show a charging operation based on driving pulses in the capacitor charger of FIG. 1.

FIG. 2 shows the relationship between driving pulse width of driving pulses supplied to the combination of switching elements S1 and S4, and the combination of switching elements S2 and S3, and the current in the windings on the secondary side of a transformer H which flows in accordance with driving pulses, that is, current data D2.

The driving pulse graph in FIG. 2 shows time on the horizontal axis and level on the vertical axis, and in the graph of current data D2 the horizontal axis is time and the vertical axis is current value.

Furthermore, FIG. 3 shows the relationship between driving pulses supplied to the combinations of switching elements, i.e., switching elements S1 and S4 and switching elements S2 and S3, and charging voltage value V1 of the load capacitor $C_D$, that is, output voltage data D1.

The driving pulse graph shows time on the horizontal axis and level on the vertical axis, and in the graph of the output voltage data D1 the horizontal axis is time and the vertical axis is voltage value.

Here, the interval from time t1 to time t8 is one cycle of the inverter section IV.

As is clear from FIG. 2 and FIG. 3, the operation of charging the load capacitor $C_D$ by the capacitor charger can be divided into three operation regions.

For example, assuming that time t1 through time t4 is the period (half cycle of the square wave ac voltage output from the inverter section IV) of a calculation driving pulse and the combination of switching elements S1 and S4 is on, current flows through the ink primary winding of the transformer H, and current induced by the primary winding of the transformer H flows through the secondary winding of the transformer H.

A region a from time t1 to time t2 is the charging period of the resonant capacitor $C_R$, and current does not flow to the load capacitor $C_D$.

That is, the region a continues for the interval from when the switching elements S1 and S4 are turned on by input of a driving pulse at time t1 until time t2, when the voltage across the resonant capacitor $C_R$ increases due to the current flowing through the primary winding of the transformer H, and reaches a voltage at which the rectifier diodes D1 and D4 in the rectifier RE on the secondary side conduct.

In FIG. 3 also, the charging voltage value V1 does not change from time t1 to time t2.

Next, a region b from time t2 to time t3 is a period when the charging voltage value V1 of the load capacitor $C_D$ increases.

That is, at time t2 the voltage across the resonant capacitor $C_R$ increases due to the current flowing through the secondary winding of the transformer, and when the voltage exceeds the charging voltage V1 of the load capacitor $C_D$ the rectifier diodes D1 and D4 conduct, which starts charging the load capacitor $C_D$.

Then, the charging in this region b continues from time t2 to time t3 when the combination of switching elements S1 and S4, which is on, is turned off, and the resonant capacitor $C_R$ and the load capacitor $C_D$ are charged during this time.

Next, in a region c from time t3 to time t4, since current flows in the same direction as in region b via diode components of the switching elements S1 and S4 in the inverter section IV due to electrical energy stored in the resonance inductor $L_R$ after the switching elements S1 and S4 are turned off, the charging voltage value V1 continues to increase.

Then, in the region c from time t3 to time t4, electrical energy of the resonant inductor $L_R$ is discharged, current flow in the inverter section IV stops at time t4 when the discharge finishes, and charging of the load capacitor $C_D$ in the case where the switching elements are driven by a driving pulse having the maximum driving pulse width from time t1 to time t3 is stopped completely.

Furthermore, at time t4, the output control circuit 13 applies the final driving pulse to the inverter section IV, and turns the combination of switching elements S2 and S3 on.

Afterwards, from time t5 to time t7, the same operation is performed as during the above-described time t2 to time t4.

Then, a train of driving pulses subsequently supplied during the period of the charging process alternately turns on the combination of switching elements S1 and S4 and the combination of switching elements S2 and S3 in the inverter section IV in a similar way to that mentioned above.

Accordingly, the polarity of the charging voltage value charging the resonant capacitor $C_R$ alternates between positive and negative for each period during which a driving pulse is input for charging. In the above-described example, the polarity of the charging voltage value charging the resonant capacitor $C_R$ is a positive voltage during the period of time (t2 to t4), and negative during the period of the final driving pulse time (t5 to t7).

From the above, when the inverter section IV is operating, the load capacitor $C_D$ is not always charged. Furthermore, even after the switching elements in the inverter section IV are all off, there is a period when the charging voltage value of the load capacitor $C_D$ increases. When obtaining the adjusted driving pulse width required to obtain the incremental voltage value ΔVc for incrementing the charging voltage value V1 to the target voltage value V2 using the final driving pulse, it is necessary to obtain the relationship between the charging time and the incremental voltage value ΔVc, being the voltage by which the voltage increments.

Here, charging time means the time (adjusted driving pulse width) during which the final driving pulse is applied in order to drive either combination of switching elements in the inverter section IV.

Hereunder is a description of a method of calculating a final driving pulse.

Figure 4:
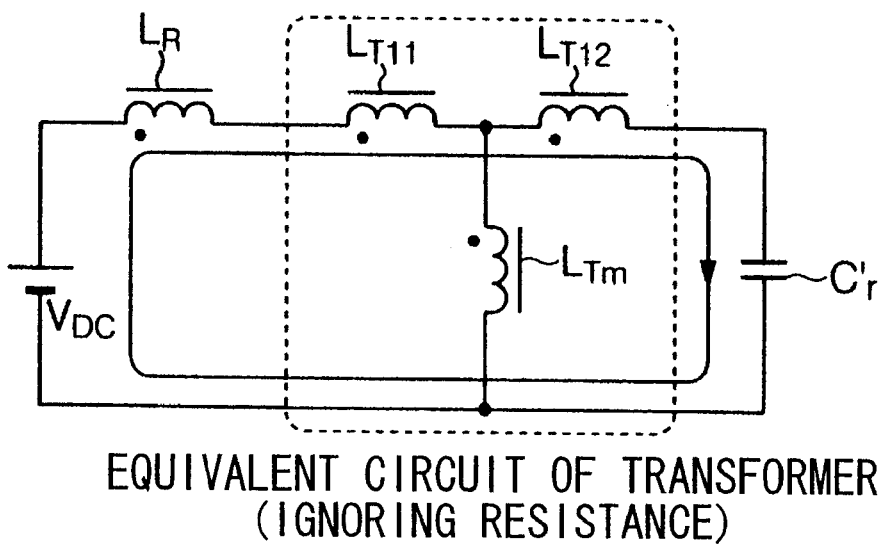
FIG. 4 is an equivalent circuit of the primary side of the capacitor charger in FIG. 1, from which a control section 1, a measurement signal input section 2, a drive circuit 3, a voltage divider M1, a current detector M2 and a voltage detector M3 have been removed.

Here, FIG. 4 shows an reduced equivalent circuit on the primary side of the capacitor charger in FIG. 1, with consideration of the leakage inductance of the transformer H, with the control section 1, the measurement signal input section 2, the drive circuit 3, the voltage divider M1, the current detector M2 and the voltage detector M3 removed. Resistance component is ignored in this equivalent circuit.

An adjusted driving pulse width is calculated using the above-described equivalent circuit in FIG. 4. However, the load seen on the primary side varies in each region of the regions a, b and c, and there are cases where current flows to both the load capacitor $C_D$ and the resonant capacitor $C_R$ and where current flows only to the resonant capacitor $C_R$, as described above, and the capacitance component is designated Cr'.

Figure 5A:
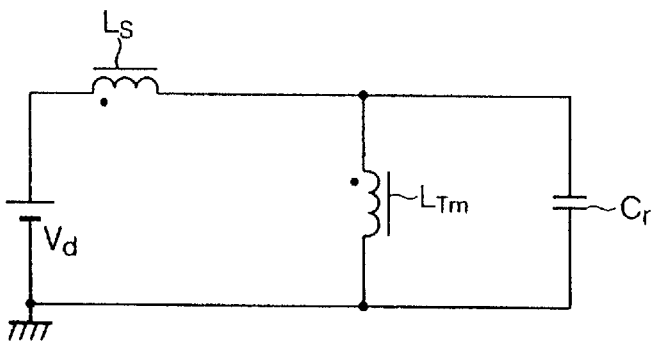
FIG. 5A through FIG. 5C are equivalent circuits for three sections of the driving pulse cycle, region a through region c, during charging.
Figure 5B:
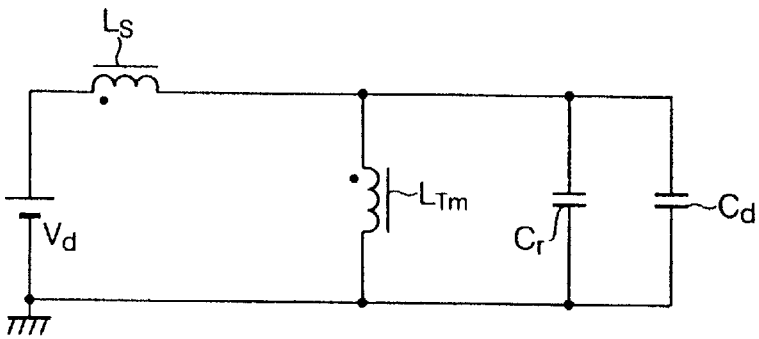
Figure 5C:
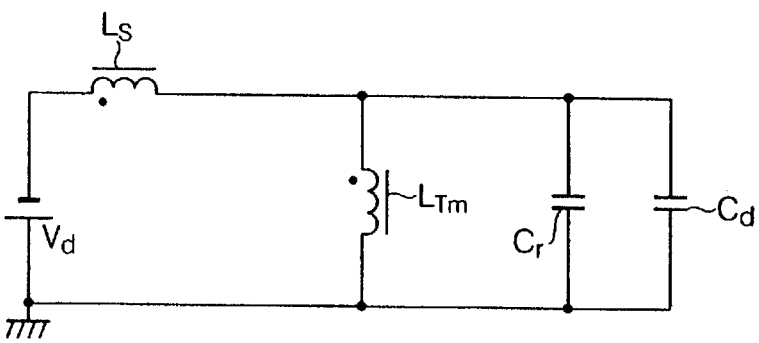

Accordingly, the operations of region a through region c can be calculated easily by the equivalent circuits shown in FIGS. 5A to 5C. Here in FIGS. 5A to 5C a leakage inductance LT11 on the primary side and a leakage inductance LT12 on the secondary side in FIG. 4 are included in the inductance of an inductor $L_R$, which is designated inductance Ls.

FIG. 5A shows an equivalent circuit during charging of the resonant capacitor $C_R$ in region a after the switching elements in the inverter IV are turned on, FIG. 5B shows an equivalent circuit during charging of both the resonant capacitor $C_R$ and the load capacitor $C_D$, that is during the increase of the charging voltage value V1, and FIG. 5C shows an equivalent circuit during the increase of the charging voltage value V1 in region c after the switching elements in the inverter IV are turned off.

As shown in FIGS. 5A to 5C, by dividing into equivalent circuits corresponding to regions a, b and c using Thevenin's theorem, the capacitor charger in FIG. 1 can be expressed by a simple circuit model in FIG. 6 in which a voltage value Vd, an inductor L and a capacitor C are used, so that it is possible to calculate an adjusted driving pulse width of a final driving pulse using the above-described circuit model.

Here, "I" represents the current in the above circuit model, and "Vc" represents the voltage value across the resonant capacitor $C_R$ in this circuit model.

The table in FIG. 7 shows the values of the inductance of the inductor L, the reactance of the capacitor C and the voltage value Vd of dc voltage in each of regions a, b and c in the circuit model shown in FIG. 6.

In FIG. 7, the inductance of the inductor L is "Lp" in all regions a, b and c with no change.

Here, the inductance "Lp" is "(Ls·LTm)/(Ls+LTm)", and the inductance "Ls" is "Lr+LT11+LT12" (primary side reduced values). "Lr" is the inductance of the resonant inductor $L_R$, LT11 and LT12 are leakage inductances on the primary side and the secondary side of the transformer H, and LTm is the mutual inductance of the transformer H. Here the calculations are all performed on the primary side reduced values.

Furthermore, the capacitance of the capacitor C is "Cr", "Cp" and "Cp" in regions a, b and c respectively. Here, the capacitance "Cp" is the capacitance when the capacitance "Cr" and the capacitance "Cd" are connected in parallel, which is the sum of "Cr" and "Cd"

The polarity of the voltage value Vd is positive in regions a and b because the inverter switch is on, and negative in region c because it is an energy recovery period.

Furthermore, the voltage value Vd can be obtained from "Vdc·LTm/(Ls+LTm)", that is the voltage Vdc (that is voltage data D3 measured by a voltage detector M3) of the voltage $V_{DC}$, the mutual inductance LTm and the inductance Ls of the inductor L.

Moreover, the current value of current flowing through the resonant capacitor $C_R$ and the current value of current flowing through the load capacitor $C_D$ in FIG. 6 are shown in the table in FIG. 8.

In region a, the current value of the current I flowing through the resonant capacitor $C_R$ is Icr, and since current does not flow through the rectifier diodes in the rectifier RE, the current flowing through the load capacitor $C_D$ is "0".

In regions b and c, current flows through both the resonant capacitor $C_R$ and the load capacitor $C_D$, and the sum of the current flowing through both becomes the current value Icp of the current I.

That is, current value "(Cr/Cp)·Icp" flows through the resonant capacitor $C_R$, and current value "(Cd/Cp)·Icp" flows through the load capacitor $C_D$.

The following equation (1) calculates the transient current value Icp (or current value Icr) of the current I in FIG. 6 using the values described above.

$$Icp = \sqrt{\frac{Cp}{Lp}}(Vd - Vci)\sin\frac{t}{\sqrt{LpCp}} + Ii\cos\frac{t}{\sqrt{LpCp}} \quad (1)$$

Here, the voltage value "Vci" represents the initial value of the voltage value Vc across the resonant capacitor $C_R$ in each region, and the current value "Ii" represents the initial value of the current value Icp in each region.

The charging voltage value V1 (output voltage data D1) and initial value Ii (current data D2), obtained from the voltage divider M1 and the current detector M2 in regions a, b and c are used for the initial value of the voltage value Vci, and the current value respectively.

The transient voltage value Vc across the capacitor C in FIG. 6 is calculated using the following equation (2) with the above-described initial values.

$$Vc = Vd + (Vci - Vd)\cos\frac{t}{\sqrt{LpCp}} + Ii\sqrt{\frac{Lp}{Cp}}\sin\frac{t}{\sqrt{LpCp}} \quad (2)$$

Next, in the case of calculation during the final driving pulse period, the current data D2 measured by the current detector M2 at time t1 in region a in FIG. 2 is used as an initial value Ii of the current value (Icr) of the current I in region a of the final driving pulse.

Furthermore, current data D2 measured by the current detector M2 at time t2 in region b is used as an initial value Ii of the current value of the current I in region b of the final driving pulse, and similarly output voltage data D1 measured by the voltage divider M1, that is charging voltage value V1, is used as an initial value Vci of the above voltage value Vc in region b of the final driving pulse.

Similarly, current data D2 measured by the current detector M2 at time t3 in region c is used as an initial value Ii of the current value of the current I in region c of the final driving pulse, and similarly output voltage data D1 measured by the voltage divider M1 is used as an initial value Vci of the above voltage value Vc in region c of the final driving pulse. However, unless there is a problem with calculation and control speed, the current and voltage values of the final driving pulse detected at time t5 are used as they stand for calculation. Time t6 and time t7 are obtained by calculation at time t5.

In order to obtain the width of a driving pulse (especially adjusted driving pulse width) for controlling the on time of the switching elements in the inverter section IV, it is necessary to obtain the relationship between the incremental voltage value ΔVc of the charging voltage value V1 of the load capacitor $C_D$ during the charging process and the voltage incrementation time t, being the time required to increment by this incremental voltage value ΔVc.

However, since the equation is complicated, numerical calculation is required, and because the incremental voltage value ΔVc cannot be obtained directly, it is not possible to obtain the relationship between the incremental voltage value ΔVc and the voltage incrementation time directly using equation (1) and equation (2).

Therefore, if "t/(LpCp)$^{1/2}$<<1" in equation (1) then equation (1) can be expressed as an approximation as shown in the following equation (3).

$$Icp = \frac{Vd - Vci}{Lp}t + Ii \quad (3)$$

Furthermore, similarly in equation (2), with "t/(LpCp)$^{1/2}$<<1" the second term is expanded to make "(Vci−Vd)·(1−t$^{1/2}$/2L·C)" and the third term approximates to "Ii·(L/C)·t/(L·C)$^{1/2}$", and by subtracting the voltage value "Vci", being the initial value, it is possible to obtain an approximation of the incremental voltage value ΔVc as in equation (4). Here, AΔt is the time for the voltage to increase by ΔVc.

$$\Delta Vc = \frac{\int_0^{\Delta t} i\, dt}{Cp} = \frac{Vd - Vci}{2LpCp}t^2 + \frac{Ii}{Cp}t \quad (4)$$

The relationship between the voltage incrementation time t and the incremental voltage value $\Delta Vc$ is obtained from equation (3) and equation (4) as shown in the following equation (5).

$$t = \frac{\frac{Ii}{Cp} - \sqrt{\left(\frac{Ii}{Cp}\right)^2 + \frac{2(Vd - Vci)}{LpCp}\Delta Vc}}{\frac{Vci - Vd}{LpCp}} \quad (5)$$

Next, to obtain the time duration of each of regions a, b and c in order to calculate the adjusted driving pulse width of the final driving pulse, there are the following three methods for calculating voltage incrementation time, each using equation (5).

The output control circuit 13 in the control section 1 performs the calculations for each of the three calculation methods.

Accordingly, the construction of the output control circuit 13 needs to be such that calculations can be performed by any one of the three calculation methods.

[1] A method for calculating all operation periods of all regions (regions a, b and c).

[2] A method for calculating only the voltage incrementation period (region b).

[3] A method for calculating the voltage incrementation period (region b), and the voltage incrementation period (region c) due to inductance current after the inverter section IV is turned off.

Firstly, method [1] is described in which all operation periods of all regions (regions a, b and c) are calculated.

As described above, it is assumed that the location of the calculation period in a train of driving pulses is detected, and after the train of driving pulses is output sequentially, the output driving pulses reach the location of the driving pulse corresponding to the calculation period (time t1 in FIG. 2).

(a) Obtaining the Time Duration of Region a

During region a, the time duration (from time t1 to time t2) in the final driving pulse from when the switching elements in the inverter section IV are turned on to when current starts flowing through the rectifier diodes in the rectifier RE is obtained.

At this time, a value calculated by the equation mentioned previously, using the voltage value Vdc (voltage data D3) measured by the voltage detector M3, is used for the voltage value of dc voltage Vd, and the charging voltage value V1 measured by the voltage divider M1 as the voltage across the resonant capacitor $C_R$ is used for the initial value Vci.

This value of the charging voltage value V1 is a reduced value of the measured value on the primary side of the transformer H, including the increase of charging voltage value V1 of the load capacitor $C_D$ after the switching elements in the inverter section IV are turned off in the previous half cycle.

Furthermore, since the polarity of the voltage charging the load capacitor $C_D$ is reversed every half cycle, the incremental voltage value $\Delta Vc$ is "2×Vci".

Then, a calculation is performed with the current value of the inverter section IV, that is the initial value Ii of the current Icr, set to "0".

By substituting the above-described voltage Vc (measured charging voltage value V1), voltage value Vd and incremental voltage value $\Delta Vc$ in equation (5), the time duration of region a, that is the time from time t4 to time t5 is obtained.

(b) Obtaining the Time Duration of Region b

The incremental voltage value $\Delta Vc$ corresponding to the adjusted driving pulse width has an incremental voltage value $\Delta Vc1$ in region b, and an incremental voltage value $\Delta Vc2$ in region c.

The time duration (from time t2 to time t3) in the final driving pulse from when current flows through the rectifier diodes in the rectifier RE to when the switching elements in the inverter section IV are turned off is obtained.

At this time, the voltage data D3 measured by the voltage detector M3 is used for the voltage value of dc voltage Vd, and the output voltage data D1 measured by the voltage divider M1 is used for the voltage Vci.

This output voltage data D1 is a reduced value of the measured value on the primary side of the transformer H, including the increase of the charging voltage value V1 of the load capacitor $C_D$ after the switching elements in the inverter section IV are turned off in the previous half cycle.

The reduced value of the current data D2 measured by the current detector M2, on the primary side of the transformer H, is used for the initial value Ii of the current I flowing through the inverter section IV.

Furthermore, a reduced value, on the primary side of the transformer H, of the value of the voltage value (voltage Vci: output voltage data D1) of the charging voltage value V1 subtracted from the target voltage value V2, is used for the incremental voltage value $\Delta Vc$.

At this time in the next region c, since the voltage increases after the switching elements in the inverter IV are turned off, it is necessary to predict this incremental voltage in region c in advance by calculation, and set a new target voltage value V2 as the value of this voltage value (the incremental voltage value $\Delta Vc2$ in region c) of the increase of voltage, subtracted from the target voltage value V2.

By substituting the above-described charging voltage value V1 (output voltage data D1), the current data D2, voltage Vd, incremental voltage value $\Delta Vc1$, inductance Lp and capacitance Cp in equation (5), the time duration of region b, that is the time from time t5 to time t6 is obtained.

(c) Obtaining the Time Duration of Region c

The time duration (from time t3 to time t4), in the final driving pulse, from when the switching elements in the inverter section IV are turned off to when the current stops flowing through the windings of the transformer H is obtained.

Here, in an equation used for calculating the time duration of region c, the incremental voltage value $\Delta Vc2$ is not involved in the calculation of time duration since charging is due to the current of the inductance $L_P$. Equation (6), obtained from equation (3), is shown as follows.

$$t = \frac{Lp}{Vd - Vci}(Icp - Ii) \quad (6)$$

At this time, a value calculated from the voltage value Vdc (voltage data D3), measured by the voltage detector M3, is used for the voltage value of dc voltage Vd, and the charging voltage value V1 (output voltage data D1), measured by the voltage divider M1, is used for the voltage Vci.

This output voltage data D1 and the voltage value Vd are reduced values on the primary side of the transformer H.

The reduced value of the current data D2 measured by the current detector M2, on the primary side of the transformer H, is used for the initial value Ii of the current I flowing through the inverter section IV.

Moreover, since the incremental voltage value ΔVc2 in region c cannot be obtained from the difference between the target voltage value V2 and the charging voltage value V1, it is obtained by the following equation (7).

$$\Delta Vc = \frac{Lp(Ii - Icp)^2}{2Cp(Vci - Vd)} \qquad (7)$$

This equation (7) is obtained by substituting equation (6) into equation (4).

Here, the values used in equation (6) are used for the values of the current value Ii, the voltage Vci and the voltage value Vd.

Furthermore, in practice, inductance current with an initial value Ii flows, and this initial value Ii is current value Icp. However, since the switching elements are off, it is approximated to "0".

Then, the time durations of the region is obtained by the above-described equation (6), and the incremental voltage value ΔVc2 in region c by equation (7).

Accordingly, the incremental voltage ΔVc2 in region c is obtained before region b, this incremental voltage ΔVc2 is subtracted from the target voltage value V2, and the time duration of region b is calculated using the subtracted value as an actual target voltage value.

The adjusted driving pulse width of the final driving pulse is obtained by adding the time durations of regions a and b obtained in the above manner.

Furthermore, if this adjusted driving pulse width is calculated by the output control circuit 13 to be greater than the maximum driving pulse width, then the next final driving pulse is used as a driving pulse corresponding to a calculation period, and supplied as a driving pulse with the maximum driving pulse width, and an adjusted driving pulse of a final driving pulse is calculated again during the timing of the driving pulse that is changed from the final driving pulse to the calculation driving pulse.

Next is a description of a method for calculating only the voltage incrementation period (region b) in [2].

As described previously, it is assumed that the timing of a calculation driving pulse is detected, and after driving pulses are output sequentially the time duration of the output driving pulses reach the calculation period (time t1 in FIG. 2).

(a) Obtaining the Time Duration of Region a

The output control circuit 13 counts the time from time t1 to time t2 using an integrated timer (omitted in the figure) to obtain the time duration of region a.

That is, the output control circuit 13 obtains the time duration of region a, from when (time t1) a driving pulse corresponding to the calculation period is output to when the detecting circuit 12 detects the time (time t2) that the charging voltage value V1 starts being incremented via the voltage detector M3, by counting using the above-described timer.

(b) Obtaining the Time Duration of Region b

The process of obtaining the time duration of region b and the incremental voltage value ΔVc1 is the same as (b) in [1], and hence the description is omitted.

(c) Obtaining an Incremental Voltage Value ΔVc2

An incremental voltage value ΔVc2 corresponding to the voltage Vd and the charging voltage value V1 is obtained in advance, and at the point of time t3 in the calculation period, based on the output voltage data D1 and the voltage data D3, an incremental voltage value ΔVc2 corresponding to these data is obtained.

The process after the time durations and the incremental voltage value ΔVc2 of these regions a and b are obtained is the same as in [1], and hence the description is omitted.

Next is a description of a method for calculating a voltage incrementation period (region b) when the switching elements in the inverter IV are on, and a voltage incrementation period (region c) after the switching elements are turned off, in [3].

As described previously, the timing of a driving pulse corresponding the calculation period is detected for driving (time t1 in FIG. 2).

(a) The Process of Obtaining the Time Duration of Region a is the Same as (a) in [2], and Hence the Description is Omitted.

(b) Obtaining the Time Duration of Region b

The process of obtaining the time duration and the incremental voltage value ΔVc1 of region b is the same as (b) in [1], and hence the description is omitted.

(c) Obtaining the Incremental Voltage Value ΔVc2 of Region c

The process of obtaining the incremental voltage value ΔVc2 is the same as (c) in [1], and hence the description is omitted.

The process after the time duration and the incremental voltage value ΔVc2 of these regions a and b are obtained is the same as in [1], and hence the description is omitted.

Furthermore, the calculation methods [1] through [3] described above use three parameters for calculation: voltage Vci (output voltage data D1), initial value Ii (current data D2) and voltage Vd. However, calculations are also possible based on voltage Vci and voltage Vd.

That is, the value measured by the current detector M2 is not used for the current data D2, and instead the current value obtained in equation (3) is used.

Moreover, for each of the time durations of regions a, b and c, values calculated by equations (5) and (6) are used as mentioned previously. Alternatively, values obtained by counting using a timer as in (a) in [2] and [3] may be used.

Accordingly, voltage Vd, calculated from the voltage data D3 using a value (output voltage data D1) measured by the voltage divider M1, is used for the voltage Vci.

Then, in the calculation of the final driving pulse in region a, "0" is used for the initial value Ii, and a result calculated using equation (3) when the previous region is finished is used in the calculations of regions b and c.

For example, current value Icp calculated using equation (3) at time t2 is used for the initial value Ii in region b, and current value Icp calculated using equation (3) at time t3 is used for the initial value Ii in region c.

The capacitor charger according to the second embodiment described above uses measured values of charging voltage value V1 and input dc voltage $V_{DC}$ in the calculation period for each region, calculates the time duration of each region of the final driving pulse using equations, and obtains an adjusted driving pulse width. Accordingly, it is possible to obtain an adjusted driving pulse width corresponding to variations of the voltage $V_{DC}$ supplied from the dc voltage source DC and the charging voltage value V1. Therefore, it is possible to obtain an adjusted driving pulse width with high accuracy, and obtain a final charging voltage value V1 that differs minimally from a target voltage value V2.

Furthermore, the capacitor charger according to the second embodiment switches the switching elements in the inverter section IV on and off by a train of driving pulses with the maximum driving pulse width, or a preset driving pulse width, until the driving pulse immediately before the final driving pulse, where an adjusted driving pulse width is used, so that it is possible to charge to the target voltage value V2 at high speed.

Embodiment 3

As a third embodiment, a lookup table method of obtaining an adjusted driving pulse width will be described in which an adjusted driving pulse width corresponding to the measured values is selected from a memory 11 which stores a table containing a plurality of adjusted driving pulse widths based on values measured by a voltage divider M1, a current detector M2 and a voltage detector M3.

Here, the process of detecting the locations in a train of driving pulses comprising the driving pulse corresponding to the calculation period and the final driving pulse is the same as in the second embodiment.

In the above-described table, adjusted driving pulse widths obtained in advance by calculations using the equations in the second embodiment and corresponding to the locations of calculation driving pulses for final driving pulses in trains of driving pulses input to an inverter section IV, are stored corresponding to combinations of output voltage data D1, current data D2 and voltage data D3 in an applicable range of values.

Then, the output control circuit 13 retrieves an adjusted driving pulse width from the above-described table corresponding to the output voltage data D1, current data D2 and voltage data D3 input from the detecting circuit 12 during the calculation period, to calculate an adjusted driving pulse width of the final driving pulse, and outputs the final driving pulse to the inverter section IV.

The capacitor charger according to the third embodiment does not need to perform calculations using equations, and hence it is also possible to perform a charging process for switching the switching elements on and off at a high resonant frequency in addition to the effects of the second embodiment.

Embodiment 4

A fourth embodiment uses a lookup table method similarly to the third embodiment, and a table stored in memory 11 stores adjusted driving pulse widths obtained in advance by the calculations in the second embodiment corresponding to the locations of calculation driving pulses for final driving pulses in trains of driving pulses input to an inverter section IV, corresponding to combinations of output voltage data D1 and voltage data D3 in an applicable range of numerical values.

Here, the process of detecting the location in a train of driving pulses comprising the calculation driving pulse and the final driving pulse is the same as in the second embodiment.

Then, the output control circuit 13 retrieves an adjusted driving pulse width from the above-described table corresponding to the output voltage data D1 (charging voltage value V1 measured by the voltage divider M1), and voltage data D3 (voltage value Vdc measured by the voltage detector M3), input from the detecting circuit 12 during the calculation period, to calculate an adjusted driving pulse width of the final driving pulse, and outputs the final driving pulse to the inverter section IV using this adjusted driving pulse.

A capacitor charger according to the fourth embodiment does not use current data D2 to calculate an adjusted driving pulse width, so there is no need to install a current detector M2. Hence it is possible to reduce the cost and simplify the apparatus in addition to the effects of the second and third embodiments.

Embodiment 5

Figure 9:
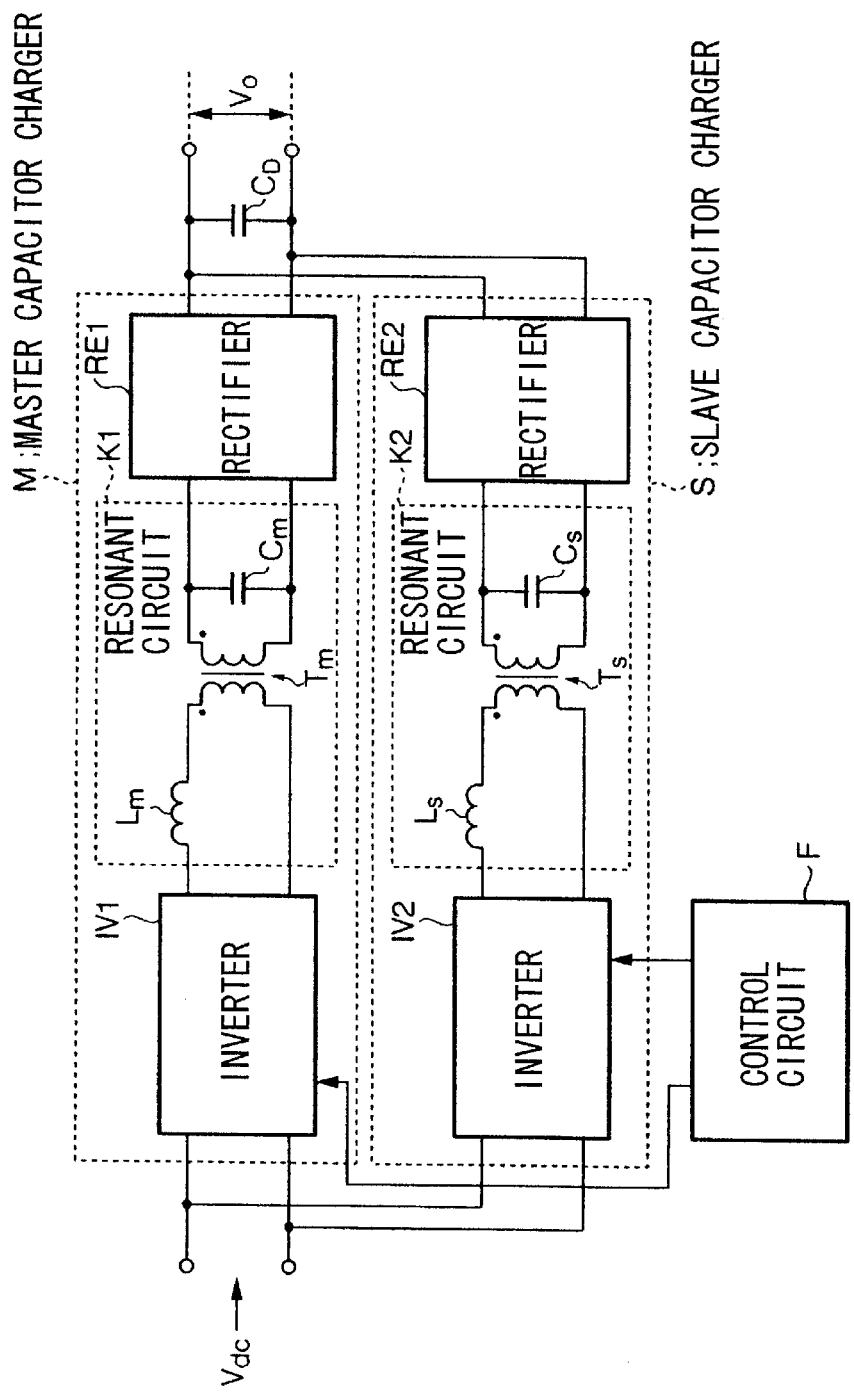
FIG. 9 is a conceptual diagram showing the construction of a capacitor charger according to a fifth embodiment of the present invention.
Figure 10:
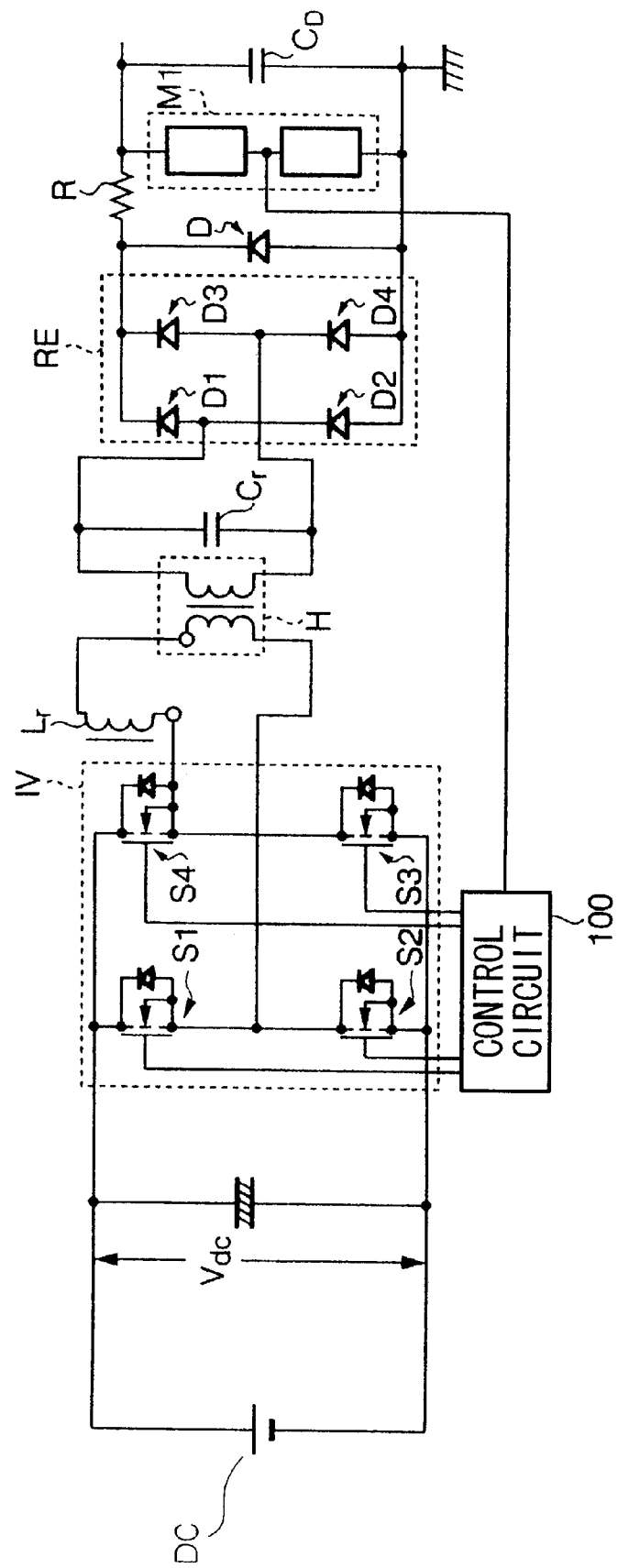
FIG. 10 is a conceptual diagram showing the construction of a capacitor charger according to a conventional example.

In the above-described second through fourth embodiments, examples are described in which a load capacitor is charged by a single capacitor charger. However, the arrangement may be such that, as shown in FIG. 9, a master capacitor charger M with a large output capacitance as described previously and a slave capacitor charger S with a smaller output capacitance are connected in parallel, and power for charging from the beginning of charging to one driving pulse prior to the final driving pulse is supplied from the master capacitor charger M, or the master capacitor charger M and the slave capacitor charger S, and the power for charging by at least the final driving pulse is supplied from the slave capacitor charger S.

In this case, it is preferable that the output voltages of the master capacitor charger M and the slave capacitor charger S are practically identical, that the output capacitance of the master capacitor charger M is several to several tens of times as large as that of the slave capacitor charger S, and that the driving pulse frequency of the slave capacitor charger S is several to several ten times as high as that of the master capacitor charger M.

In a first embodiment of a driving method of a capacitor charger with this structure, the number of driving pulses of the slave capacitor charger S corresponds to the adjusted driving pulse width of the final driving pulse of the master capacitor charger M described previously.

That is, the number of driving pulses of the slave capacitor charger S is calculated such that the adjusted charging power supplied from the slave capacitor charger S in the final half cycle is equal to the adjusted charging power supplied by the final driving pulse of an adjusted driving pulse width from the master capacitor charger M.

In this case, if there is additional charging time available, the calculation driving pulse of the master capacitor charger M is obtained as described previously, the slave capacitor charger S operates from when the calculation driving pulse is finished, the adjusted charging power that the master capacitor charger M supplies by the final driving pulse of the adjusted driving pulse width is obtained, and at the same time the number of driving pulses is obtained by calculation from the adjusted charging power supplied in each driving pulse from the slave capacitor charger S, and when the number of driving pulses is reached the supply of driving pulses is stopped and the slave capacitor charger S is stopped.

In a driving method of the fifth embodiment, in order to enhance charging accuracy in response to variations of ac input voltage, by using a midpoint preset voltage value V3 that is lower than the target voltage value V2 by a voltage value corresponding to the boost voltage charged by several driving pulses, the variation of ac input voltage at that time is included as a factor when the driving pulse width of the driving pulses is calculated, and charging is performed by driving the master capacitor charger M by driving pulses of a new, fixed driving pulse width obtained including this calculation factor. Also the slave capacitor charger S is driven when the load capacitor $C_D$ is charged to the midpoint preset voltage value V3, the master capacitor charger M is stopped with the aforementioned calculation driving pulse being its last, and only the slave capacitor charger S is driven in the final charging period by driving pulses of the number of driving pulses obtained by calculation as mentioned above to charge to the target voltage value V2.

Here, the master capacitor charger M and the slave capacitor charger S are the same as in the construction in FIG. 1. Inverter sections IV1 and IV2 correspond to the inverter section IV, rectifiers RE1 and RE2 correspond to the rectifier RE in FIG. 1, and resonant circuits K1 and K2 are the same as the circuit comprising the transformer H, the resonant inductor $L_R$ and the resonant capacitor $C_R$.

A control circuit F is provided with circuits similar to the control section 1, the measured signal input section 2 and the drive circuit 3 for both of the inverter sections IV1 and IV2.

Furthermore, the master capacitor charger M and the slave capacitor charger S may have the same circuit construction. However, if the master capacitor charger M supplies more than 99% of the charging power required and the slave capacitor charger S less than 1% for example, the slave capacitor charger S has a low power loss, so it does not have to be a resonant type circuit construction. For example, it may be a non resonant type circuit J structure using a typical driving pulse width control type of high frequency inverter section.

Moreover, in the above description, the width of driving pulses is described as the maximum permissible driving pulse width, or a preset driving pulse width. However, the driving pulse width is inevitably determined according to the setting of the charging time to charge the load capacitor to the target voltage value, and charging must be performed within the preset charging time. However, there is a problem in that if it is faster than the preset charging time, the charging voltage may be lowered by discharge. Therefore, it is desirable to determine the driving pulse width of the driving pulses such that charging to the target voltage value is completed a little before the preset charging time.

According to the above-described capacitor charger, using measured values of charging voltage value V1 and input dc voltage $V_{DC}$ for each region of the calculation driving pulse, each of the time durations of the regions a, b and c of the final driving pulse is calculated by equations during the calculation driving pulse, and an adjusted driving pulse width is obtained by summing them. As a result, it is possible to calculate an adjusted driving pulse width in response to a variation of input voltage $V_{DC}$ and charging voltage value V1 in a timely manner. Accordingly, it is possible to obtain an adjusted driving pulse width with high accuracy, and obtain a final charging voltage value V1 that has a smaller difference from the target voltage value V2.

Furthermore, according to the above-described capacitor charger, switching the combination of switching elements in the inverter section IV on and off is performed by a train of driving pulses of maximum driving pulse width until the driving pulse immediately before the final driving pulse which uses an adjusted driving pulse width. Hence it is possible to charge to the target voltage value V2, being the final target of the charging voltage V1, at high speed.

The embodiments of the present invention have been described in detail above with reference to figures. However, specific constructions are not limited to these embodiments, and design changes and the like within a scope that does not depart from the gist of the present invention are included in the present invention.

What is claimed is:

1. A capacitor charging method in which a resonant type inverter section is operated by driving pulses at a fixed frequency to generate an ac voltage, the ac voltage is converted to a dc voltage, and a capacitor is charged using the dc voltage, comprising the steps of:

a first step where a first type of driving pulse of the driving pulses has a fixed driving pulse width W1 determined in advance, which charges the capacitor by a boost voltage ΔVn (n is a natural number, ΔV1, ΔV2, . . . ) at each input of the first type of driving pulse; and a second step which charges the capacitor by a single or a plurality of a second type of driving pulse having a controlled driving pulse width W2 (W1>W2) as required to increase the voltage of the capacitor by a voltage [V2−V1] when a charging voltage V1 of the capacitor reaches a value that satisfies [V2>V1>V2−V1<ΔVn] for a target voltage value V2.

2. A capacitor charging method in which a resonant type inverter section is operated by driving pulses at a fixed frequency to generate an ac voltage, the ac voltage is converted to a dc voltage, and a capacitor is charged using the dc voltage, comprising the steps of:

a first step where a first type of driving pulse of the driving pulses has a fixed driving pulse width W1 determined in advance, which charges the capacitor by a boost voltage ΔVn (n is a natural number, ΔV1, ΔV2, . . . ) at each input of the first type of driving pulse; and a second step which charges the capacitor by a plurality of a second type of driving pulse having a fixed driving pulse width W3 (W1>W3) in order to boost the voltage by [V2−V1] when a relationship between a charging voltage V1 of the capacitor and a target voltage value V2 is [V2−V1<ΔVk+ . . . +ΔVn (k is a natural number, and k<n), or [V2−V1<ΔVn].

3. A capacitor charging method according to claim 2, wherein only the last driving pulse among a plurality of the second type of driving pulses in the second step has a controlled driving pulse width.

4. A capacitor charging method in which a resonant type inverter section is operated by driving pulses at a fixed frequency to generate an ac voltage, the ac voltage is converted to a dc voltage, and a capacitor is charged using the dc voltage, comprising the steps of:

a first step where a first type of driving pulse of the driving pulses has a fixed driving pulse width W1 determined in advance, which charges the capacitor by a boost voltage ΔVn (n is a natural number, ΔV1, ΔV2, . . . ) at each input of the first type of driving pulse;

a second step which when a charging voltage V1 of the capacitor is a midpoint preset voltage value V3 that is lower than a target voltage value V2, charges by a boost voltage ΔVm (m is a natural number), by using a second type of driving pulse with a new, fixed driving pulse width W4 obtained with consideration of a change of input voltage to the resonant type inverter section; and a third step which charges by a third type of driving pulse having a controlled driving pulse width W5 (W5<W4) as required to boost the voltage by [V2−V1<ΔVm].

5. A capacitor charging method according to claim 1, wherein at the start of charging of the first step, the capacitor is charged by a fixed driving pulse width smaller than the fixed driving pulse width W1, or a soft start driving pulse with a gradually increasing driving pulse width.

6. A capacitor charging method according to claim 2, wherein at the start of charging of the first step, the capacitor is charged by a fixed driving pulse width smaller than the fixed driving pulse width W1, or a soft start driving pulse with a gradually increasing driving pulse width.

7. A capacitor charging method according to claim 3, wherein at the start of charging of the first step, the capacitor is charged by a fixed driving pulse width smaller than the fixed driving pulse width W1, or a soft start driving pulse with a gradually increasing driving pulse width.

8. A capacitor charging method according to claim 4, wherein at the start of charging of the first step, the capacitor is charged by a fixed driving pulse width smaller than the fixed driving pulse width W1, or a soft start driving pulse with a gradually increasing driving pulse width.

9. A capacitor charger in which a resonant type inverter section is switched by driving pulses at a fixed frequency to generate an ac voltage, the ac voltage is converted to a dc voltage by a rectifier, and a capacitor is charged using the dc voltage, comprising:
   a control section that controls such that the voltage of the capacitor is increased by a boost voltage $\Delta Vn$ (n is a natural number, $\Delta V1, \Delta V2, \ldots$) at each input to the resonant type inverter section of a first type of driving pulse with a predetermined, fixed driving pulse width W1, calculates an $n^{th}$ first type of driving pulse with the fixed driving pulse width W1 when a relationship between a charging voltage V1 of the capacitor and a target voltage value V2 satisfies [V2>V1>V2−V1<$\Delta Vn$] (n is a natural number), calculates at least one of a required adjusted driving pulse width and the number of driving pulses, of a second type of driving pulse that is supplied in order to increase the voltage of the capacitor by [V2−V1] when a relationship [V2−V1<$\Delta Vn$] is satisfied, drives the resonant type inverter section by the first type of driving pulse until the relationship [V2−V1<$\Delta Vn$] is satisfied for the charging voltage V1, drives the resonant type inverter section by the second type of driving pulse when the relationship [V2−V1<$\Delta Vn$] is satisfied, and charges the capacitor to the target voltage value V2.

10. A capacitor charger in which a resonant type inverter section is switched by driving pulses at a fixed frequency to generate an ac voltage, the ac voltage is converted to a dc voltage by a rectifier, and a capacitor is charged using the dc voltage, comprising:
   a control section that controls such that the voltage of the capacitor is increased by a boost voltage $\Delta Vn$ (n is a natural number, $\Delta V1, \Delta V2, \ldots$) at each input to the resonant type inverter section of a first type of driving pulse with a predetermined, fixed driving pulse width W1, calculates an $n^{th}$ first type of driving pulse with the fixed driving pulse width W1 when a relationship between a charging voltage V1 of the capacitor and a target voltage value V2 satisfies [V2−V1<$\Delta Vn+ \ldots \Delta Vn+k$] (k is a natural number, k<n), or [V2−V1<$\Delta Vn$], calculates the number of driving pulses of a second type of driving pulse with a fixed driving pulse width W2 (W1>W2) that is supplied in order to increase the voltage of the capacitor by [V2−V1] when the relationship [V2−V1<$\Delta Vn+ \ldots \Delta Vn+k$] or [V2−V1<$\Delta Vn$] is satisfied, drives the resonant type inverter section by the first type of driving pulse until a relationship [V2>V1>V2−V1<$\Delta Vn+ \ldots \Delta Vn+k$] or [V2−V1<$\Delta Vn$] is satisfied for the charging voltage V1, drives the resonant type inverter section by the second type of driving pulse when the relationship [V2>V1>V2−V1<$\Delta Vn+ \ldots \Delta Vn+k$] or [V2−V1<$\Delta Vn$] is satisfied, and charges the capacitor to the target voltage value V2.

11. A capacitor charger in which a resonant type inverter section is switched by driving pulses at a fixed frequency to generate an ac voltage, the ac voltage is converted to a dc voltage by a rectifier, and a capacitor is charged using the dc voltage, comprising:
   a control section that controls such that the voltage of the capacitor is increased by a boost voltage $\Delta Vn$ (n is a natural number, $\Delta V1, \Delta V2, \ldots$) at each input to the resonant type inverter section of a first type of driving pulse with a predetermined, fixed driving pulse width W1, calculates an $n^{th}$ first type of driving pulse with the fixed driving pulse width W1 when a relationship between a charging voltage V1 of the capacitor and a midpoint preset voltage value V3, that is lower than a target voltage value V2, satisfies [V2−V1<$\Delta Vn+ \ldots \Delta Vn+k$] (k is a natural number, and k<n), drives the resonant type inverter section by a second type of driving pulse of a fixed driving pulse width W3 obtained by another calculation when the relationship [V2−V1<$\Delta Vn+ \ldots \Delta Vn+k$] is satisfied, calculates a controlled pulse width or the number of controlled driving pulses of a third type of driving pulse when a relationship [V2−V1<$\Delta Vp$] (p is a natural number) is satisfied for the charging voltage V1 of the capacitor, drives the resonant type inverter section by the third type of driving pulse, and charges the capacitor to the target voltage value V2.

12. A capacitor charger according to claim 9, wherein the control section calculates the driving pulse width using a predetermined equation based on an input voltage value input to the capacitor charger, a voltage value of charging voltage V1, and a current value supplied to the capacitor.

13. A capacitor charger according to claim 10, wherein the control section calculates the driving pulse width using a predetermined equation based on an input voltage value input to the capacitor charger, a voltage value of charging voltage V1, and a current value supplied to the capacitor.

14. A capacitor charger according to claim 11, wherein the control section calculates the driving pulse width using a predetermined equation based on an input voltage value input to the capacitor charger, a voltage value of charging voltage V1, and a current value supplied to the capacitor.

15. A capacitor charger according to claim 9, wherein the control section reads out from a lookup table showing a relationship between detected values of input voltage input to the capacitor charger, voltage values of the charging voltage V1, and current values supplied to the capacitor, and values of the driving pulse width, a driving pulse width value corresponding to these detected values, to thereby calculate the driving pulse width.

16. A capacitor charger according to claim 10, wherein the control section reads out from a lookup table showing a relationship between detected values of input voltage input to the capacitor charger, voltage values of the charging voltage V1, and current values supplied to the capacitor, and values of the driving pulse width, a driving pulse width value corresponding to these detected values, to thereby calculate the driving pulse width.

17. A capacitor charger according to claim 11, wherein the control section reads out from a lookup table showing a relationship between detected values of input voltage input to the capacitor charger, voltage values of the charging voltage V1, and current values supplied to the capacitor, and values of the driving pulse width, a driving pulse width value corresponding to these detected values, to thereby calculate the driving pulse width.

18. A capacitor charger according to claim 9, wherein the control section reads out from a lookup table showing a relationship between detected values of input voltage input to the capacitor charger and the charging voltage V1, and values of the driving pulse width, a driving pulse width value corresponding to these detected values, to thereby calculate the driving pulse width.

19. A capacitor charger according to claim 10, wherein the control section reads out from a lookup table showing a relationship between detected values of input voltage input to the capacitor charger and the charging voltage V1, and values of the driving pulse width, a driving pulse width value corresponding to these detected values, to thereby calculate the driving pulse width.

20. A capacitor charger according to claim 11, wherein the control section reads out from a lookup table showing a relationship between detected values of input voltage input to the capacitor charger and the charging voltage V1, and values of the driving pulse width, a driving pulse width value corresponding to these detected values, to thereby calculate the driving pulse width.

* * * * *

UNITED STATES PATENT AND TRADEMARK OFFICE
CERTIFICATE OF CORRECTION

PATENT NO. : 6,661,205 B1
DATED : December 9, 2003
INVENTOR(S) : Muraki et al.

It is certified that error appears in the above-identified patent and that said Letters Patent is hereby corrected as shown below:

Column 8,
Line 26, now reads "Wn-4>Wn3>Wn-2" should read -- Wn-4>Wn-3>Wn-2 --

Column 9,
Line 24, now reads "the ink primary" should read -- the primary --

Column 12,
Line 66, now reads "Here, AΔt" should read -- Here, Δt --

Signed and Sealed this

Twenty-second Day of June, 2004

JON W. DUDAS
*Acting Director of the United States Patent and Trademark Office*